(12) United States Patent
Desai (10) Patent No.: US 11,875,325 B2
(45) Date of Patent: *Jan. 16, 2024

(54) SYSTEMS AND METHODS FOR CLIENT-SIDE MANAGEMENT OF RECURRING PAYMENT TRANSACTIONS

(71) Applicant: Worldpay, LLC, Symmes Township, OH (US)

(72) Inventor: Snehal Desai, Westford, MA (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,739

(22) Filed: Dec. 5, 2022

(65) Prior Publication Data

US 2023/0103106 A1  Mar. 30, 2023

Related U.S. Application Data

(63) Continuation of application No. 16/884,218, filed on May 27, 2020, now Pat. No. 11,544,687, which is a continuation of application No. 14/561,613, filed on Dec. 5, 2014, now Pat. No. 10,706,399.

(51) Int. Cl.
*G06Q 20/14* (2012.01)
*G06Q 20/34* (2012.01)

(52) U.S. Cl.
CPC .............. *G06Q 20/14* (2013.01); *G06Q 20/34* (2013.01)

(58) Field of Classification Search
CPC ....................................................... G06Q 20/00

USPC ................................................. 705/35, 36 R
See application file for complete search history.

(56) References Cited

U.S. PATENT DOCUMENTS

| | | | |
|---|---|---|---|
| 6,997,378 B2* | 2/2006 | Phillips | G06Q 40/12 705/30 |
| 7,107,243 B1* | 9/2006 | McDonald | G06Q 20/10 705/40 |
| 7,685,024 B2* | 3/2010 | Ofer | G06Q 30/0641 705/26.7 |
| 7,958,050 B2* | 6/2011 | Finch | G06Q 20/102 705/40 |
| 7,962,424 B1* | 6/2011 | Colosso | G06F 21/105 705/901 |
| 8,606,714 B1* | 12/2013 | Cameo | G06Q 20/4037 705/40 |
| 2001/0051919 A1* | 12/2001 | Mason | G06Q 30/0601 705/40 |
| 2002/0004770 A1* | 1/2002 | Phillips | G06Q 20/14 705/30 |
| 2002/0072944 A1* | 6/2002 | Artinger | G06Q 30/016 705/28 |
| 2002/0091634 A1* | 7/2002 | Eubanks | G06Q 30/02 705/39 |
| 2003/0023550 A1* | 1/2003 | Lee | H04L 12/1453 705/40 |

(Continued)

*Primary Examiner* — Kirsten S Apple
(74) *Attorney, Agent, or Firm* — Bookoff McAndrews, PLLC (57) ABSTRACT

Systems and methods disclosed herein for the client-side management of recurring payment transactions. An account holder can interact with a consumer computing device, such as a smart phone or tablet computer, to provide billing parameters for recurring payments to a merchant. The billing parameters can be updated over time by the account holder.

20 Claims, 7 Drawing Sheets

(56) References Cited

U.S. PATENT DOCUMENTS

| | | | |
|---|---|---|---|
| 2003/0040990 A1* | 2/2003 | Lee | G06Q 40/02 705/30 |
| 2003/0065616 A1* | 4/2003 | O'Donnell, Jr. | G06Q 20/10 705/40 |
| 2003/0163397 A1* | 8/2003 | Mayo | G06Q 30/02 705/34 |
| 2005/0144130 A1* | 6/2005 | Staniar | G06Q 20/102 705/40 |
| 2005/0149544 A1* | 7/2005 | Bishop | G06Q 20/327 |
| 2005/0160038 A1* | 7/2005 | Albornoz | G06Q 20/108 705/42 |
| 2005/0192833 A1* | 9/2005 | Artinger | G06Q 40/08 705/4 |
| 2005/0283434 A1* | 12/2005 | Hahn-Carlson | G06Q 10/10 707/999.1 |
| 2005/0283437 A1* | 12/2005 | McRae | G06Q 20/102 705/40 |
| 2006/0206425 A1* | 9/2006 | Sharma | G06Q 20/02 705/40 |
| 2007/0083459 A1* | 4/2007 | Eubanks | G06Q 30/06 705/38 |
| 2007/0100745 A1* | 5/2007 | Keiser | G06Q 20/403 705/38 |
| 2007/0219900 A1* | 9/2007 | MacGuire | G06Q 40/00 705/38 |
| 2008/0015945 A1* | 1/2008 | Goldstein | G06Q 30/0633 705/26.8 |
| 2008/0177581 A1* | 7/2008 | Artinger | G06Q 40/08 705/4 |
| 2008/0270293 A1* | 10/2008 | Fortune | G06Q 20/102 705/40 |
| 2009/0063276 A1* | 3/2009 | Ekechukwu | G06Q 30/0277 705/14.73 |
| 2010/0036769 A1* | 2/2010 | Winters | G06Q 20/10 705/40 |
| 2010/0174644 A1* | 7/2010 | Rosano | G06Q 20/14 705/40 |
| 2010/0179837 A1* | 7/2010 | Artinger | G06Q 40/08 715/708 |
| 2010/0299230 A1* | 11/2010 | Patterson | G06Q 20/10 705/30 |
| 2010/0299253 A1* | 11/2010 | Patterson | G06Q 40/02 705/40 |
| 2011/0145111 A1* | 6/2011 | Ljunggren | G06Q 20/10 705/30 |
| 2012/0116963 A1* | 5/2012 | Klein | G06Q 20/102 705/40 |
| 2013/0346302 A1* | 12/2013 | Purves | G06Q 20/102 705/40 |
| 2014/0012706 A1* | 1/2014 | Foerster | G06Q 30/04 705/26.81 |
| 2014/0279459 A1* | 9/2014 | Weiss | G06Q 20/26 705/40 |
| 2014/0304186 A1* | 10/2014 | Brown | G06Q 30/0279 705/329 |
| 2014/0358783 A1* | 12/2014 | Mansur | G06Q 20/10 705/44 |
| 2016/0092874 A1* | 3/2016 | O'Regan | G06Q 20/3221 705/44 |
| 2016/0180302 A1* | 6/2016 | Bagot, Jr. | G06Q 20/102 705/40 |

* cited by examiner

SYSTEMS AND METHODS FOR CLIENT-SIDE MANAGEMENT OF RECURRING PAYMENT TRANSACTIONS

CROSS-REFERENCE TO RELATED APPLICATION(S)

This patent application is a continuation of and claims the benefit of priority to U.S. application Ser. No. 16/884,218, filed on May 27, 2020, which is a continuation of U.S. application Ser. No. 14/561,613, now U.S. Pat. No. 10,706,399, filed on Dec. 5, 2014, the entirety of which is incorporated herein by reference.

TECHNICAL FIELD

The systems and methods described below relate generally to the field of recurring financial transactions. More particularly, the systems and methods relate to the field of client-side management and control of recurring financial transactions.

BACKGROUND

Payment card transactions are used for a great number of purchases and sales between merchants and cardholders. A payment card transaction can involve a number of parties, including an account holder who possesses the payment card, a merchant, an acquirer processor, an issuer processor, issuer financial institution and a card association network. Millions of such transactions occur daily at merchants using a variety of payment card types, such as credit cards, debit cards, prepaid cards, and so forth. Some of these transactions are based on a recurring payment schedule that is managed by the merchant. While recurring billing arrangements offer a certain level of convenience for the account holder, once a recurring payment billing arrangement is formed, the account holder may have difficulty modifying or terminating the billing arrangement.

SUMMARY

In an embodiment, the present disclosure is directed, in part, to a computer-implemented method. The method comprises displaying a graphical user interface on a display of a consumer computing device that is executing an application. The application is associated with an acquirer processor. The method also comprises receiving a selection of a merchant through an interaction with the graphical user interface, wherein the acquirer processor processes payments on behalf of the selected merchant. The method also comprises receiving billing parameters, wherein the billing parameters comprise a merchant identifier, a payment amount, a recurring payment schedule, and payment vehicle data. Based on the recurring payment schedule, transaction data is electronically transmitted to the acquirer processor, wherein the transaction data comprises the merchant identifier, the payment amount, and the payment card data.

In an embodiment, the present disclosure is directed, in part, to a recurring payment transaction system. The recurring payment transaction system comprises a consumer computing device comprising a processor executing instructions stored in memory, wherein the instructions cause the processor to display a merchant list on a graphical user interface on a display of the consumer computing device, receive a selection of a merchant from the merchant list, wherein an acquirer processor processes payments on behalf of the merchant and receive billing parameters, wherein the billing parameters comprises a payment amount, a recurring payment schedule, and payment vehicle data. Based on the recurring payment schedule, transaction data is electronically transmitted to the acquirer processor, wherein the transaction data identifies the merchant and comprises the payment amount and the payment vehicle data.

In an embodiment, the present disclosure is directed, in part, to an acquirer processor computing system comprising a processor executing instructions stored in memory, wherein the instructions cause the processor to enroll a merchant into a recurring payment computing platform for accepting client-originated payment vehicle payments. The acquirer processor computing system also comprises instructions that when executed cause the processor to process transaction data received from a consumer computing device, wherein the transaction data is associated with a recurring billing arrangement between an account holder and the merchant, and wherein the transaction date identifies the merchant, a payment amount, and a payment vehicle. The acquirer processor computing system also comprises instructions that when executed cause the processor to communicate with a card issuer associated with the payment vehicle to seek payment authorization and communicate an authorization response message received from the card issuer to the merchant.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Various non-limiting embodiments of the present disclosure will now be described to provide an overall understanding of the principles of the structure, function, and use of systems and methods disclosed herein for the client-side management of recurring payment transactions. One or more examples of these non-limiting embodiments are illustrated in the selected examples disclosed and described in detail with reference made to FIGS. 1-7 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle," which generally refers to any type of financial alternative to currency. As is to be clear to those skilled in the art, no aspect of the present disclosure is specifically limited to a specific type of payment vehicle. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), and the like. Payment vehicles can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle can also have electronic functionality provided by a network of electronic circuitry that is printed or otherwise incorporated onto or within the payment vehicle (and typically referred to as a "smart card"), or be a fob having a transponder and an RFID reader.

Some consumers, referred to herein as account holders, have a need to utilize recurring payment transactions to periodically transmit funds to a merchant through a series of payment vehicle-based transactions. Such recurring payment transactions can be associated with, for example, a purchase plan, a subscription, membership plan, or installment payment plan between the merchant. The account holder, however, may wish to maintain some level of control over the recurring payment transactions. In accordance with the present disclosure, and as described in more detail below, an account holder can initiate and control payment transactions to a merchant from a consumer computing device. Through interactions with a consumer computing device, an account holder can update the billing parameters (i.e., amount, frequency, card information, etc.). The account holder can also optionally cancel future recurring payment transactions. Accordingly, an account holder can enter into recurring billing arrangements with a variety of merchants with the ability to subsequently manage the future payments to that merchant.

Figure 1:
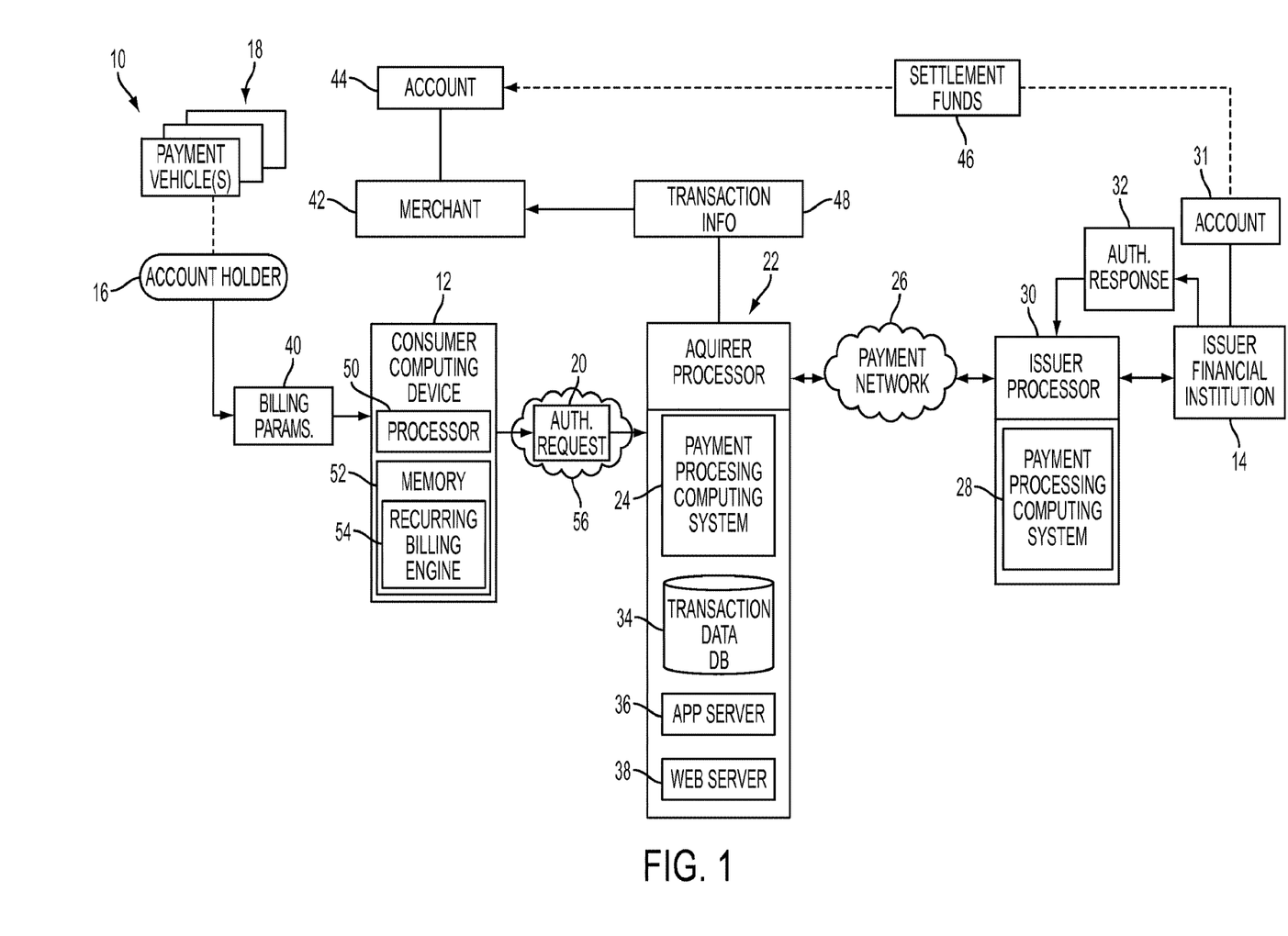
FIG. 1 depicts a block diagram of an example payment system incorporating various recurring payment management functionalities.

FIG. 1 depicts a block diagram of an example payment system 10 incorporating various the client-side recurring payment management functionalities. In the example payment system 10, an account holder 16 is associated with at least one payment vehicle 18 that is issued by an issuer financial institution 14. As is to be appreciated, the account holder 16 may be associated with a plurality of different payment vehicles, such as debit cards, prepaid cards, credit cards, and so forth. The issuer financial institution 14 can be any of a variety of financial institutions that is capable of issuing a payment vehicle to an account holder. Generally, the payment vehicle 18 can be used to facilitate payment to a merchant 42 for a purchase transaction. It is to be appreciated that the merchant 42 can be any type of merchant or service provider, such as a brick-and-mortar merchant, an online merchant, a mobile merchant, a kiosk, or any other type of merchant or device configured to receive payment cards from account holders as a form of payment.

In the payment system 10, a consumer computing device 12 that is associated with (i.e., operated by) the account holder 16 can run an application for communicating with an acquirer processor 22, the merchant 42, as well as other entities, over a network 56. The application can be stored in memory 52 and be executed by a processor 50. In FIG. 1, the application is schematically shown as recurring billing engine 54 for the purposes of illustration. An example application is a web browser. In a configuration, consumer computing device 12 is a cell phone, smart phone, tablet, laptop, or other suitable computing platform having wireless connectivity to a network 56. In a configuration, the application is a specialized application that is available from the Apple™ iStore™, or another "app store," for downloading onto and executing on an Apple™ iPhone™ or iPad™ or other type of smart phone or networked device. In some embodiments, the consumer computing device 12 can be a desktop system, gaming system, a wearable computer, a networked television, or another suitable computing platform, whether mobile or non-mobile. Furthermore, the network 56 can be any suitable wired or wireless network, or a combination of both, whether private or public, and including, but not limited to, the Internet and telephony based networks.

In the system 10, the user or account holder executes an application on their consumer computing device 12 to communicate with the acquirer processor 22 to initiate and manage recurring payment transactions with the merchant 42. In one embodiment, the application is configured at least to cause the consumer computing device 12 to send an authorization request message to the acquirer processor 22 to initiate a payment transaction. The consumer computing device 12 may or may not send a separate request or notification to the merchant 42.

In one embodiment, the consumer computing device 12 includes a magnetic strip reader for receiving payment vehicle information, such as information from the payment vehicle 18. In another embodiment, the consumer computing device 12 includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, and so forth. In some embodiments, an account holder 16 can provide payment vehicle information through inputting the information via an input device, such as a keyboard. As is to be appreciated, the consumer computing device 12 can include various input/output devices, as is known in the art. For example, the consumer computing device 12 can include buttons, a touchscreen, a display screen, a remote control, a handheld controller, and so forth. Further, the consumer computing device 12 can have a network interface (not shown), as is known in the art.

During a recurring payment transaction event, the consumer computing device 12 can send an authorization request 20 for a payment vehicle transaction to the acquirer processor 22 that processes payment vehicle transactions for the merchant 42. As is to be appreciated, additional intermediary entities, such as one or more payment gateways, can assist with the handling and routing of the authorization request 20, or other related messaging. For the purposes of illustration, such intermediary entities may be considered part of the acquirer processor 22. The authorization request 20 can include identifying information from the payment vehicle 26, such as a BIN number, an expiration date, and a first and last name of the account holder, and a PIN, for example, as may be provided by the account holder 16 during a recurring payment configuration process. The authorization request 20 can include also include purchase related information, such as a merchant identifier and a purchase amount. While a single authorization request 20 is illustrated in FIG. 1, a series of authorization requests 20 can be sent over time, as specified by the account holder 16 during the recurring payment configuration process. For example, authorization requests 20 can be sent weekly, monthly, quarterly, yearly, or on any other payment schedule.

A payment processing computing system 24 at the acquirer processor 22 can receive the authorization request 20 from the consumer computing device 12. The payment processing computing system 24 can translate the authorization request 20, if necessary, and can provide the authorization request 20 to a payment network 26. The payment network 26 can be, for example, a network of a credit card association affiliated with the payment vehicle 18. Non-limiting examples of credit card associations include VISA, MASTERCARD, DISCOVER, and AMERICAN EXPRESS. The authorization request 20 can then be provided to a payment processing computing system 28 at an issuer processor 30. In response to receiving the authorization request, and based on the type of payment vehicle 26, the payment processing computing system 28 may provide the authorization request 20 to the issuer financial institution 14. Using information from the authorization request, the issuer financial institution 14 can associate the purchase transaction with an account 31 of the account holder 13 held by the issuer financial institution 14. The issuer financial institution 14 can then send an authorization response 32 which can either approve or deny the transaction. The authorization response 32 can be provided to the payment processing computing system 28 at the issuer processor 30 and then provided to the payment network 26. The authorization response 32 can then be provided to the payment processing computing system 24 at the acquirer processor 22. Upon receiving the authorization response 32, the payment processing computing system 24 can send either an approval message or a denial message to the merchant 42 and/or the consumer computing device 12 to complete the purchase transaction. If the purchase transaction is approved, it can be posted to the account holder's account 31, with settlement funds 46 eventually transferred from the account holder's account 31 to an account 44 of the merchant 42.

Transaction records can be stored in one or more locations within the system 10. In one embodiment, the transaction record can stored within a transaction data database 34 of the acquirer processor 22. The transaction data can be received by the transaction data database 34 from various sources, such as the consumer computing device 12, the merchant 16, the acquirer processor 22, and so on. A plurality of transaction parameters associated with the purchase transaction can be stored in each transaction record which can generally be used for settlement and financial recordkeeping. While the transaction parameters stored in each transaction record can vary, example transaction parameters can include, without limitation, account number, card number, payment vehicle information, product information (such as product type, product serial number, and so forth), transaction amount, loyalty account information, merchant information, transaction amount, response code, transaction date, transaction time, whether the transaction was a "card present" transaction, and so on.

As shown in FIG. 1, the acquirer processor 22 can include several computer servers and databases. For example, the acquirer processor 22 can include one or more web servers 38, application servers 36, and/or any other type of servers. For convenience, only one web server 38 and one application server 36 are shown in FIG. 1, although it should be recognized that the disclosure is not so limited. The servers can cause content to be sent to the to the consumer computing device 12 and/or the merchant 42 in any number of formats, such as text-based messages, multimedia message, email messages, smart phone notifications, web pages, and so forth. The servers 36, 38 can comprise processors (e.g., CPUs), memory units (e.g., RAM, ROM), non-volatile storage systems (e.g., hard disk drive systems), etc. The servers 36, 38 can utilize operating systems, such as Solaris, Linux, or Windows Server operating systems, for example.

The web server 38 can provide a graphical web user interface through which various users of the system can interact with the acquirer processor 22. The web server 38 can accept requests, such as HTTP requests, from clients (such as web browsers on the consumer computing device 12), and serve the clients responses, such as HTTP responses, along with optional data content, such as web pages (e.g., HTML documents) and linked objects (such as images, video, and so forth).

The application server 36 can provide a user interface for users who do not communicate with the acquirer processor 22 using a web browser. Such users can have special software installed on their consumer computing device 12 that allows them to communicate with the application server 36 via the network 56. Such software can be downloaded, for example, from the acquirer processor 22, or other software application provider, over the network to such consumer computing device 12.

The graphical user interface provided by the web server 38 or the application server 36, as the case may be, can permit users via the consumer computing device 12 104 to communicate with the acquirer processor 22 to initiation, configure, and manage recurring billing relationships with one or more merchants. Through interactions with an application on their consumer computing device 12, the account holder 16 can establish billing parameters for a recurring billing arrangement. Such parameters can be changed or modified over time. For example, the account holder 16 may wish to change the payment vehicle being used for the recurring transaction, update information regarding the payment vehicle of record, change the payment date, change the amount and/or cancel future recurring payments. Such changes or modifications can, in some circumstances, generally occur without requiring consent or other input from the merchant 42.

Figure 2:
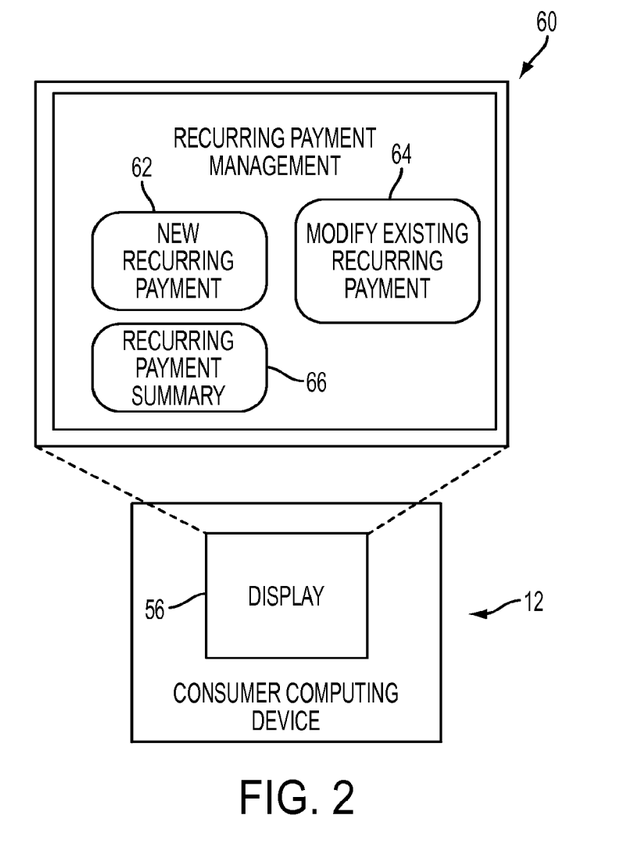
FIG. 2 depicts an example simplified graphical user interface displayed on a consumer computing device.

FIG. 2 depicts an example simplified graphical user interface 60 that can be presented on a display 56 of the consumer computing device 12. The graphical user interface 60 can be presented using hypertext markup language (HTML) and Java scripts, or a dedicated applet or application, or any other suitable interfacing means as would be known or understood in the art. The account holder 16 can be presented with a variety of management tools or options associated with recurring payment transactions. In the illustrated embodiment, the options are presented as selectable graphical elements or icons, namely, an option to create a new recurring payment 62, an option to modify an existing recurring payment 64, and an option to view a recurring payment summary 66. As is to be appreciated, the graphical user interface 60 illustrated in FIG. 2 has been simplified for the sake of clarity.

Figure 3A:
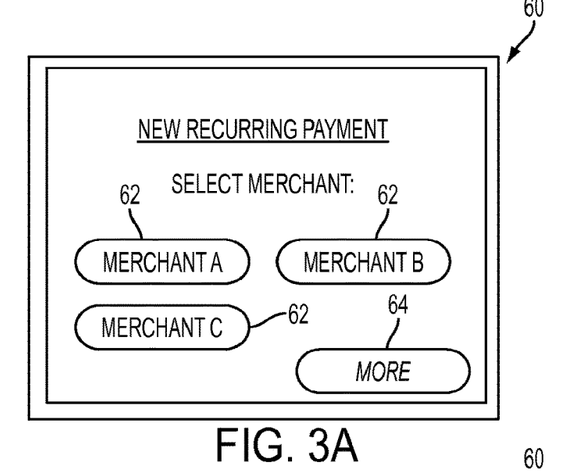
FIGS. 3A-3C depict an example simplified graphical user interface during a new recurring payment configuration process.
Figure 3B:
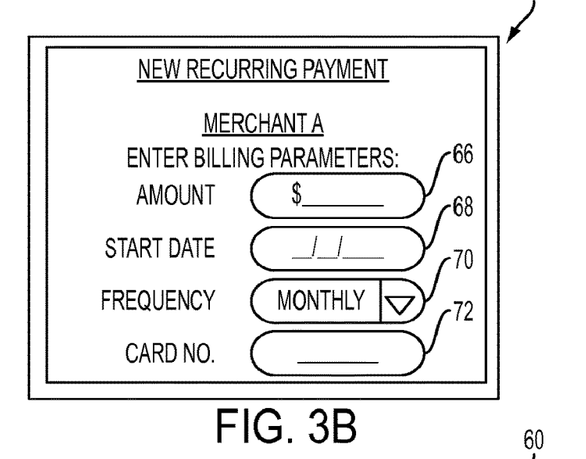
Figure 3C:
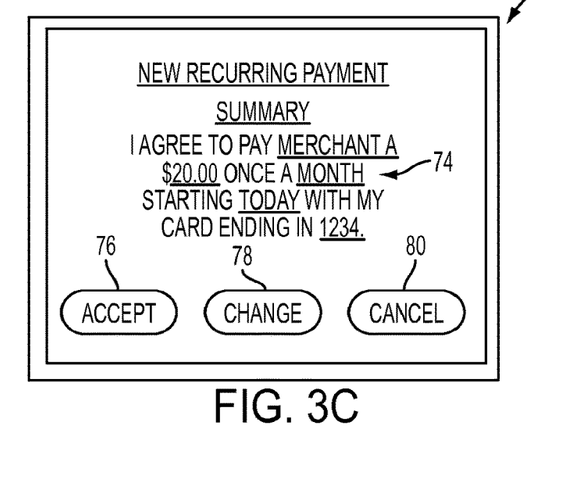

FIGS. 3A-3C depict an example simplified graphical user interface during a new recurring payment configuration process. This graphical user interface can be displayed subsequent to the account holder 16 activating the new recurring payment option 62 through interactions with the application executing on their consumer computing device 12. Referring first to FIG. 3A, a plurality of merchant names are each presented as selectable graphical elements 62. Additional merchants can be displayed if the "more" element 64 is selected. Generally, the merchant names identify particular merchants, such as merchant 42 (FIG. 1), to which client-side recurring payment transactions can be directed. In some embodiments, the displayed merchants to the account holder 16 include merchants that have enrolled into a recurring payment computing platform of the acquirer processor 22. The graphical user interface 60 can include a search feature for the account holder 16 to locate various merchants. In some embodiments, the presentment of merchant names is based on geo-location using GPS functionality of the consumer computing device 12. In some embodiments, the application is merchant-specific so this particular step is not required. In any event, the merchants presented to the account holder 16 can be the merchants that have a relationship with the acquirer processor 22 and have established communication protocols to support the client-side recurring transactions described herein.

Referring next to FIG. 3B, the graphical user interface 60 is shown subsequent to the account holder 16 selecting "merchant A" from the graphical user interface 60 shown in FIG. 3A. Once the merchant is selected, various billing parameters can be received from the account holder 16. In the illustrated embodiment, the billing parameters include an amount 66, a start date 68, a frequency 70, and a payment vehicle number 72. As is to be appreciated, however, a wide variety of billing parameters can be used, such as a merchant category code (MCC) a merchant identification code (MID), and so forth. Additionally, while FIG. 3B illustrates the billing parameters being inputted by the account holder 16, in some embodiments, various billing parameters can be pre-populated or otherwise provided by other sources, such as by the merchant A.

FIG. 3C depicts an example simplified confirmation screen that can be displayed on the graphical user interface 60. Generally, the confirmation screen can include a summary 74 of the recurring billing arrangement. The confirmation screen can also provide the account holder 16 with various options, such as an option to accept the billing arrangement 76, an option to change the billing arrangement 78, and an option to cancel the billing arrangement 80. Upon acceptance of the billing arrangement, recurring transactions can be processed in accordance with the billing parameters.

In some embodiments, the authorization messages are generated by the mobile communicating device 12, as described above. In other embodiments, the billing parameters are provided to the acquirer processor 22 such that the acquirer processor 22 can generate the authorization messages in accordance with the billing parameters. In any event, the account holder 16, through interactions with the consumer computing device 12, can provide some or all of the billing parameters and subsequently maintain control over the recurring payment transactions as time progresses.

Figure 4A:
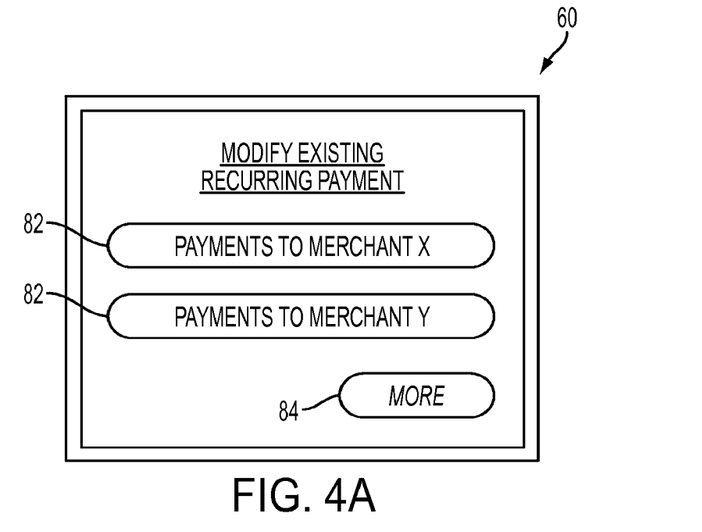
FIGS. 4A-4B depict an example simplified graphical user interface during a modification of an existing recurring payment process.
Figure 4B:
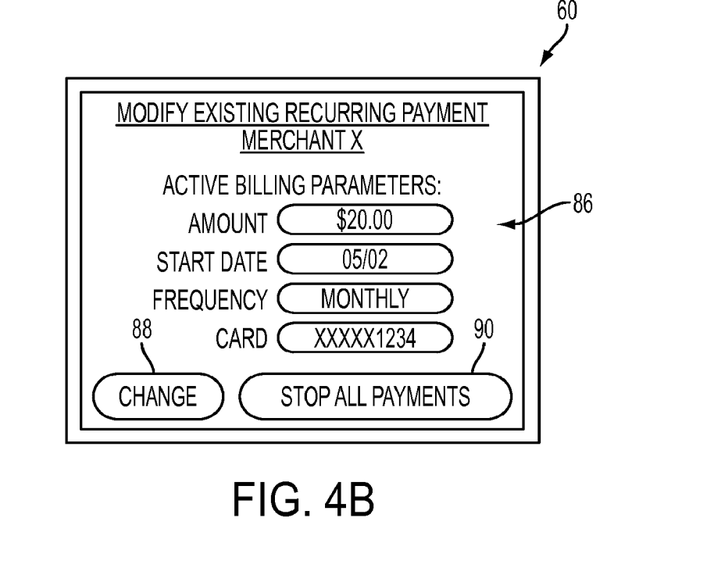

FIGS. 4A-4B depict an example simplified graphical user interface during a modification of an existing recurring payment relationship. Referring first to the graphical user interface 60 illustrated in FIG. 4A, such a graphical user interface can be displayed to the account holder 16 upon the selection of the option to modify existing recurring payment 64 of FIG. 1, for example. The graphical user interface 60 can display an indication of existing recurring payment relationships with various merchants 82. In the illustrated embodiment, the graphical user interface 60 indicates that the account holder 16 is currently engaged with recurring payment relationships with merchant x and merchant y. Additional merchants can be displayed if the "more" element 64 is selected. The account holder 16, through interactions with the consumer computing device 12, can select which arrangement to modify. FIG. 4B depicts the graphical user interface upon the selection of merchant X. The graphical user interface 60 can provide a summary 86 of the currently active billing parameters. Through interactions with the graphical user interface 60, the account holder 16 can then modify some or all of the billing parameters using a change option 88. In this regard, the account holder 16 can provide information for a different payment vehicle, change the frequency, change the amount, or make a variety of other changes. Furthermore, should the account holder 16 wish to cease the recurring payment relationship, the account holder 16 can select the stop of payments option 90. Therefore, the account holder 16 is given the ability to easily modify, and if necessary cease, the recurring payment relationship using their consumer computing device 12.

Figure 5:
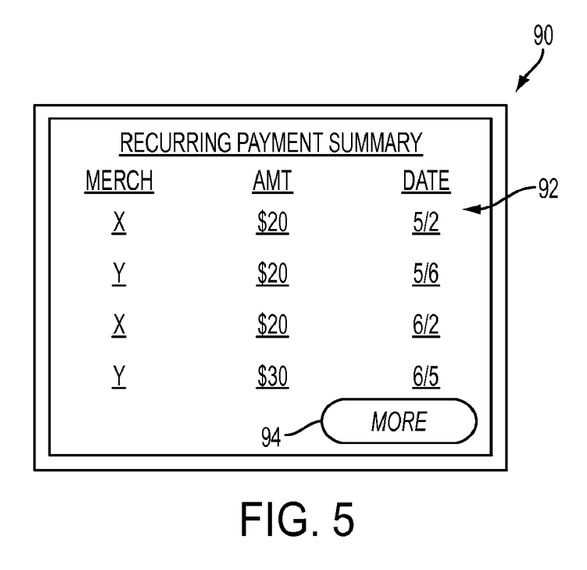
FIG. 5 depicts an example simplified graphical user interface displaying a recurring payment summary.

Through interactions with the consumer computing device 12, the account holder 16 can review recurring payment activity. FIG. 5 depicts an example simplified graphical user interface displaying a recurring payment summary 92. The graphical user display 60 of FIG. 5 can be presented in response to the account holder 16 selecting the recurring payment summary option 66 (FIG. 2), for example. The account holder 16 can be provided with an overview of the various transactions that have been processed, including an indication of the associated merchant, the data, the amount, and so forth. Additional transactions can be displayed if the "more" element 94 is selected.

Figure 6:
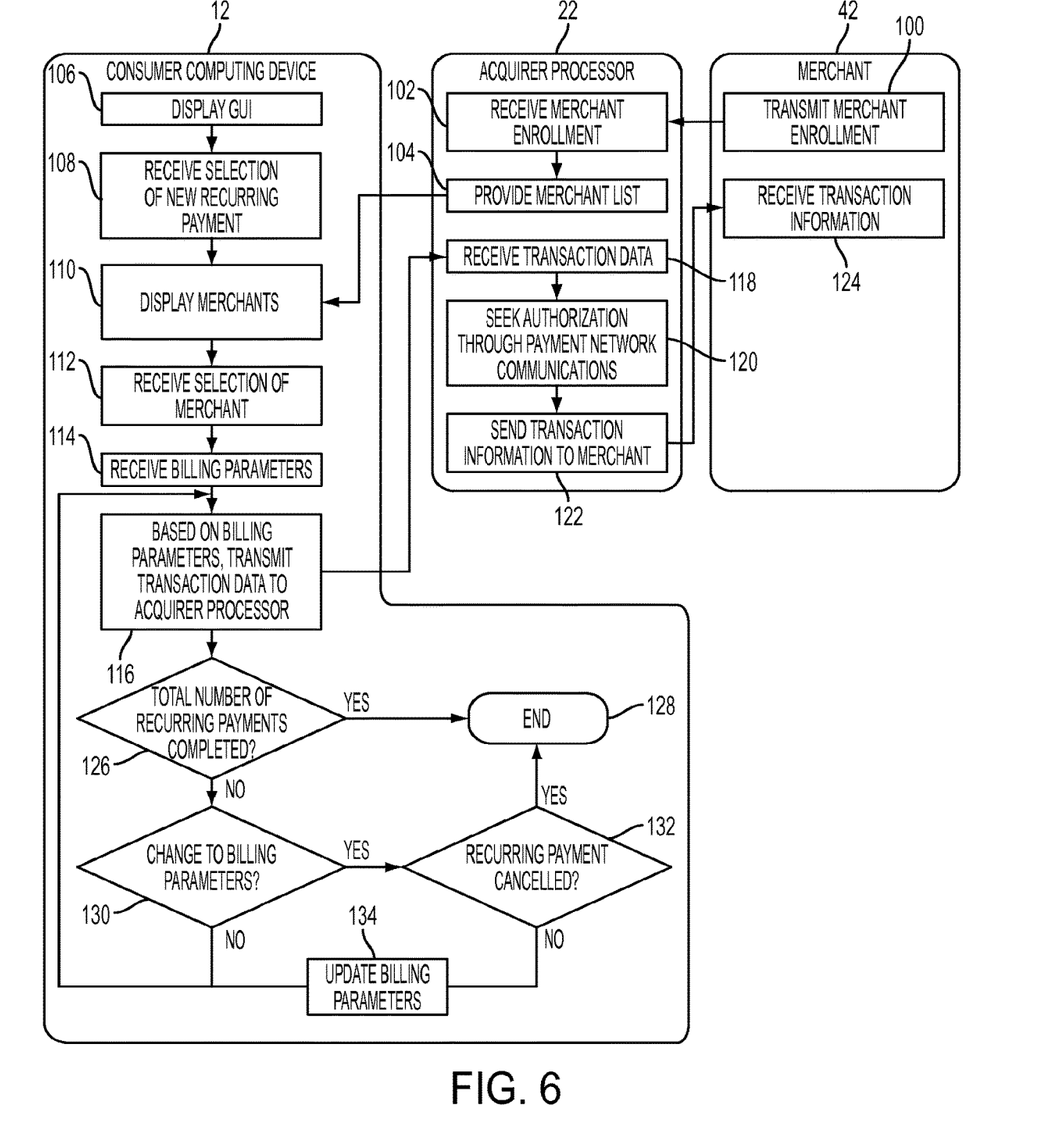
FIG. 6 depicts example process flows which can be executed by various components of the system of FIG. 1.

FIG. 6 depicts example process flows that can be executed by system of FIG. 1. The example process flows includes various steps or events that are handled at the consumer computing device 12, the acquirer processor 22, and the merchant 42. The merchant 42, at 100, transmits a merchant enrollment message to the acquirer processor 22. At 102, the merchant enrollment message is received at the acquirer processor 22. Additional messaging can occur between the acquirer processor 22 to enroll the merchant 42 into the recurring payment computing platform of the acquirer processor 22. Once enrolled, the merchant 42 can accept client-side recurring payments in accordance with the present disclosure.

At 106, a graphical user interface can be displayed on a consumer computing device 12. The graphical user interface can be displayed, for example, in response to the account holder 16 wishing to establish a recurring payment relationship with a particular merchant. At 108, a selection of an option to create new recurring payment is received. At 110, a list of merchants is displayed on the consumer computing device 12. The list of merchants can be provided by the acquirer processor 22 and can include the merchants that have enrolled in the recurring payment computing platform, such as merchant 42. At 112, a selection of a particular merchant is received. At 114, billing parameters are received. The billing parameters can be received from a user of the consumer computing device or other suitable data source.

At 116, based on the billing parameters that were received at 114, transaction data is transmitted to the acquirer processor 22. In some embodiments, the transaction data is submitted in an authorization request. At 118, the transaction data is received at the acquirer processor 22. At 120, in accordance with payment processing protocol, authorization is sought through payment network communications. Such communications can include various messaging between the acquirer processor 22 and a payment network 26, or other types of messaging as may be based on the type of payment vehicle identified in the transaction data. As is to be appreciated, the payment processing for open-loop payment vehicles will differ from the payment processing for closed-loop payment vehicles, for example. At 122, transaction information can be sent to the merchant 122. The transaction data is received by the merchant at 124. The transaction information can be used by the merchant for record keeping, financial settlement purposes and/or customer tracking.

At 126, it is determined if a total number of recurring payments has been completed. The total number of payments can be provided in the billing parameters, for example. In some embodiments, the recurring payments are perpetual such that there is not a total number of payments. If the total number of payment has been completed, at 128, the recurring payment relationship between the account holder and the merchant is ended. If the total number of payment has not been completed, it is determined at 130 is there are any changes to the billing parameters. Example changes to the billing parameters can include the user of the consumer computing device 12 changing the payment vehicle information, changing the payment amount, changing the frequency, changing an end date, and so forth. If there have been no changes, the process returns to 116 to submit the transaction data in accordance with the billing parameters. If there have been changes to the billing parameters, at 132, it is determined if the recurring billing has been cancelled. If the recurring billing has been cancelled, at 128, the recurring payment relationship between the account holder and the merchant is ended. If the recurring billing has not been cancelled, at 134, the billing parameters are updated and the process returns to 116 to submit the transaction data in accordance with the newly updated billing parameters.

Figure 7:
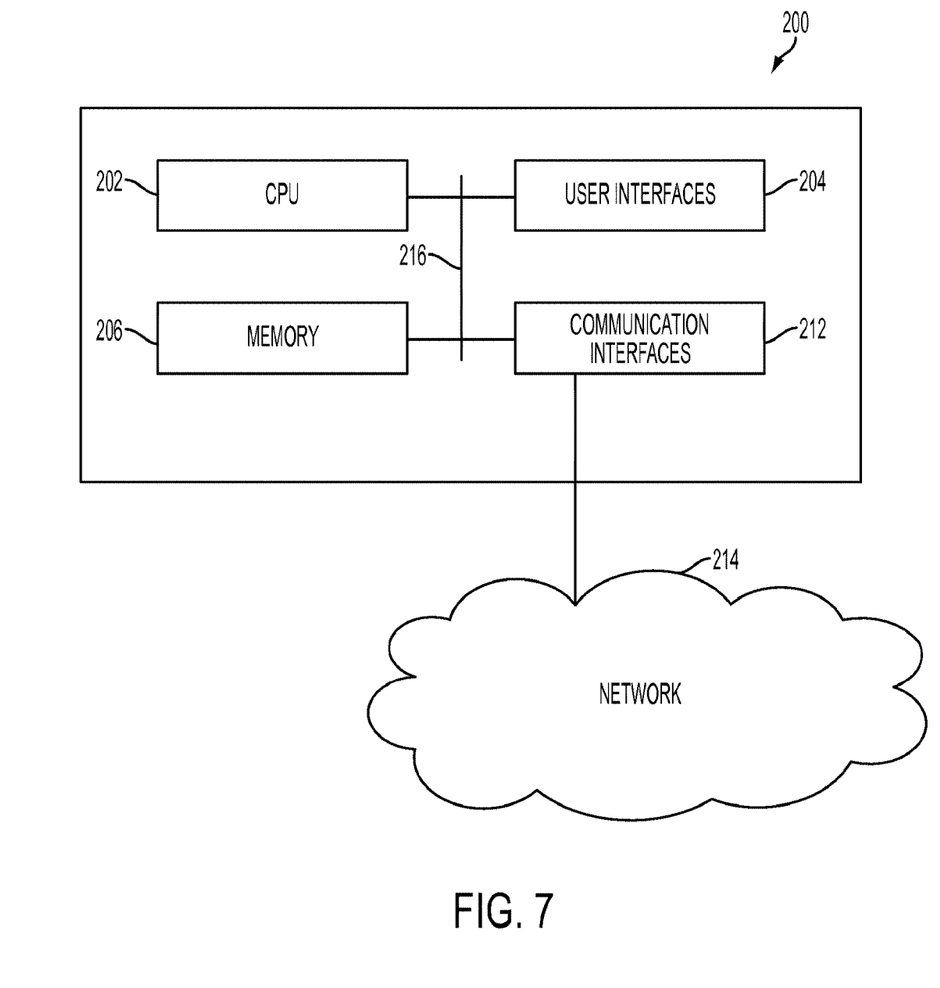
FIG. 7 schematically depicts a computing device.

The processes described herein can be performed on or between one or more computing devices. Referring now to FIG. 7, an example computing device 200 is presented. A computing device 200 can be a server, a computing device that is integrated with other systems or subsystems, a mobile computing device, a cloud-based computing capability, and so forth. The computing device 200 can be any suitable computing device as would be understood in the art, including without limitation, a custom chip, an embedded processing device, a tablet computing device, a consumer computing device 12, a payment processing computing system 24, a recurring billing engine 54, a merchant 42, a payment processing computing system 28, a recurring payment computing platform, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 200 includes a processor 202 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 200 also includes one or more memories 206, for example read only memory (ROM), random access memory (RAM), cache memory associated with the processor 202, or other memories such as dynamic RAM (DRAM), static ram (SRAM), programmable ROM (PROM), electrically erasable PROM (EEPROM), flash memory, a removable memory card or disk, a solid state drive, and so forth. The computing device 200 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 202, or memories 206 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 212 can be configured to transmit to, or receive data from, other computing devices 200 across a network 214. The network and communication interfaces 212 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 212 can include wired data transmission links such as Ethernet and TCP/IP. The communication interfaces 212 can include wireless protocols for interfacing with private or public networks 214. For example, the network and communication interfaces 212 and protocols can include interfaces for communicating with private wireless networks such as a WiFi network, one of the IEEE 802.11x family of networks, or another suitable wireless network. The network and communication interfaces 212 can include interfaces and protocols for communicating with public wireless networks 212, using for example wireless protocols used by cellular network providers, including Code Division Multiple Access (CDMA) and Global System for Mobile Communications (GSM). A computing device 200 can use network and communication interfaces 212 to communicate with hardware modules such as a database or data store, or one or more servers or other networked computing resources. Data can be encrypted or protected from unauthorized access.

In various configurations, the computing device 200 can include a system bus 216 for interconnecting the various components of the computing device 200, or the computing device 200 can be integrated into one or more chips such as programmable logic device or application specific integrated circuit (ASIC). The system bus 216 can include a memory controller, a local bus, or a peripheral bus for supporting input and output devices 204, and communication interfaces 212. Example input and output devices 204 include keyboards, keypads, gesture or graphical input devices, motion input devices, touchscreen interfaces, one or more displays, audio units, voice recognition units, vibratory devices, computer mice, and any other suitable user interface.

The processor 202 and memory 206 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein. Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. A computer-implemented method for client-side management of recurring transactions, comprising:
   receiving, by a consumer application, a list of merchants available for processing recurring transactions from an acquirer processor;
   receiving, by the consumer application, a selection of a merchant from among the list of merchants and a recurring transaction schedule;
   transmitting, by the consumer application based on the recurring transaction schedule, a transaction authorization request directly to the acquirer processor, the transaction authorization request comprising a merchant identifier and a transaction account number; and
   receiving, by the consumer application, a transaction authorization response from the acquirer processor.

2. The computer-implemented method of claim 1, further comprising:
   receiving, by the acquirer processor, registration messages from merchant systems, the registration messages registering merchants associated with the merchant systems into a recurring transaction platform;
   determining, by the acquirer processor, the list of merchants available for processing recurring transactions based on the registration messages; and
   transmitting, by the acquirer processor, the list of merchants to the consumer application.

3. The computer-implemented method of claim 1, further comprising, prior to the consumer application receiving the transaction authorization response from the acquirer processor:
   receiving, by the acquirer processor, the transaction authorization request from the application;
   transmitting, by the acquirer processor, the transaction authorization request to a payment network;
   receiving, by the acquirer processor, the transaction authorization response from the payment network; and
   transmitting, by the acquirer processor, the transaction authorization response to the consumer application.

4. The computer-implemented method of claim 1, further comprising:
   receiving, by the consumer application, a change to the recurring transaction schedule.

5. The computer-implemented method of claim 4, wherein the change to the recurring transaction schedule comprises a termination of all future payments to the merchant.

6. The computer-implemented method of claim 1, wherein the recurring transaction schedule is any of a weekly payment cycle, a monthly payment cycle, a quarterly payment cycle, and a yearly payment cycle.

7. The computer-implemented method of claim 1, wherein the recurring transaction schedule comprises a total number of recurring transactions and a transaction amount for each recurring transaction.

8. The computer-implemented method of claim 1, wherein a graphical user interface (GUI) is displayed within the consumer application via an application server implemented on the acquirer processor.

9. The computer-implemented method of claim 1, wherein a graphical user interface (GUI) is displayed using hypertext markup language (HTML), Java script, or a dedicated applet or application.

10. The computer-implemented method of claim 1, wherein the consumer application is downloaded from the acquirer processor or a third-party software application provider.

11. A system for client-side management of recurring transactions, comprising:
   one or more processors; and
   one or more computer readable media storing instructions which, when executed by the one or more processors, cause the one or more processors to perform operations comprising:
      receiving, by a consumer application, a list of merchants available for processing recurring transactions from an acquirer processor;
      receiving, by the consumer application, a selection of a merchant from among the list of merchants and a recurring transaction schedule;
      transmitting, by the consumer application based on the recurring transaction schedule, a transaction authorization request directly to the acquirer processor, the transaction authorization request comprising a merchant identifier and a transaction account number; and
      receiving, by the consumer application, a transaction authorization response from the acquirer processor.

12. The system of claim 11, the operations further comprising:
   receiving, by the acquirer processor, registration messages from merchant systems, the registration messages registering merchants associated with the merchant systems into a recurring transaction platform;
   determining, by the acquirer processor, the list of merchants available for processing recurring transactions based on the registration messages; and
   transmitting, by the acquirer processor, the list of merchants to the consumer application.

13. The system of claim 11, the operations further comprising, prior to the consumer application receiving the transaction authorization response from the acquirer processor:
   receiving, by the acquirer processor, the transaction authorization request from the application;
   transmitting, by the acquirer processor, the transaction authorization request to a payment network;
   receiving, by the acquirer processor, the transaction authorization response from the payment network; and
   transmitting, by the acquirer processor, the transaction authorization response to the consumer application.

14. The system of claim 11, the operations further comprising:
   receiving, by the consumer application, a change to the recurring transaction schedule.

15. The system of claim 14, wherein the change to the recurring transaction schedule comprises a termination of all future payments to the merchant.

16. The system of claim 11, wherein the recurring transaction schedule is any of a weekly payment cycle, a monthly payment cycle, a quarterly payment cycle, and a yearly payment cycle.

17. The system of claim 11, wherein the recurring transaction schedule comprises a total number of recurring transactions and a transaction amount for each recurring transaction.

18. The system of claim 11, wherein a graphical user interface (GUI) is displayed within the consumer application via an application server implemented on the acquirer processor.

19. The system of claim 11, wherein a graphical user interface (GUI) is displayed using hypertext markup language (HTML), Java script, or a dedicated applet or application.

20. One or more non-transitory computer readable media storing instructions which, when executed by one or more processors, cause the one or more processors to perform operations for client-side management of recurring transactions, the operations comprising:
receiving, by a consumer application, a list of merchants available for processing recurring transactions from an acquirer processor;
receiving, by the consumer application, a selection of a merchant from among the list of merchants and a recurring transaction schedule;
transmitting, by the consumer application based on the recurring transaction schedule, a transaction authorization request directly to the acquirer processor, the transaction authorization request comprising a merchant identifier and a transaction account number; and
receiving, by the consumer application, a transaction authorization response from the acquirer processor.

* * * * *